(12) United States Patent
Cadman et al.

(10) Patent No.: US 10,196,983 B2
(45) Date of Patent: Feb. 5, 2019

(54) FUEL NOZZLE FOR GAS TURBINE ENGINE

(71) Applicant: General Electric Company, Schenectady, NY (US)

(72) Inventors: John Michael Cadman, Mason, OH (US); Thomas Ryan Wallace, Cincinnati, OH (US); Brian Matthias Schaldach, Cincinnati, OH (US); Randy Joseph Tobe, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 487 days.

(21) Appl. No.: 14/932,187

(22) Filed: Nov. 4, 2015

(65) Prior Publication Data

US 2017/0122212 A1    May 4, 2017

(51) Int. Cl.
*F02C 7/24* (2006.01)
*F02C 7/22* (2006.01)
*F23R 3/28* (2006.01)

(52) U.S. Cl.
CPC ............... *F02C 7/24* (2013.01); *F02C 7/222* (2013.01); *F23R 3/28* (2013.01); *F05D 2240/35* (2013.01); *F05D 2260/231* (2013.01); *F23R 2900/00004* (2013.01); *F23R 2900/00005* (2013.01)

(58) Field of Classification Search
CPC ...... F02C 7/24; F02C 7/20; F23R 3/28; F05D 2260/231; F05D 2240/35; F05D 2220/32
See application file for complete search history.

(56) References Cited

U.S. PATENT DOCUMENTS

| 4,070,826 | A |   | 1/1978  | Stenger et al. |
|-----------|---|---|---------|----------------|
| 4,322,945 | A |   | 4/1982  | Peterson et al. |
| 5,239,831 | A |   | 8/1993  | Kuroda et al. |
| 5,333,459 | A | * | 8/1994  | Berger .................. F23C 7/006 60/39.23 |
| 5,353,599 | A |   | 10/1994 | Johnson et al. |
| 5,570,580 | A | * | 11/1996 | Mains .................... F23D 11/36 239/132.5 |
| 6,199,367 | B1| * | 3/2001  | Howell .................. F23D 11/24 239/402.5 |
| 8,033,113 | B2|   | 10/2011 | Patel et al. |
| 8,973,367 | B2|   | 3/2015  | Bötcher et al. |
| 2004/0129001 | A1 | * | 7/2004 | Lehtinen .................. F02C 3/00 60/740 |

(Continued)

*Primary Examiner* — Ted Kim
(74) *Attorney, Agent, or Firm* — General Electric Company; Pamela Kachur

(57) ABSTRACT

A fuel nozzle configured to channel fluid towards a combustion chamber is provided. The fuel nozzle includes a stem having a central passageway and at least one fuel tube disposed within the passageway. The fuel tube includes an outlet end portion having inner and outer walls separated by a cavity defined by a fixed aft face. The inner wall defines a central bore for delivering fuel to the combustion chamber. Further, the fuel nozzle includes an outer heat shield tube concentrically aligned with the outlet end portion of the fuel tube. The heat shield tube includes a circumferential outer wall having an aft face that stops upstream of the fixed aft face of the fuel tube. Thus, during operation, the heat shield tube is configured to thermally expand by sliding against the outer wall of the fuel tube.

13 Claims, 6 Drawing Sheets

(56) References Cited

U.S. PATENT DOCUMENTS

| | | | |
|---|---|---|---|
| 2010/0307159 A1* | 12/2010 | Toon | F23D 11/38 |
| | | | 60/746 |
| 2010/0307161 A1* | 12/2010 | Thomson | F23D 11/107 |
| | | | 60/748 |
| 2013/0037628 A1* | 2/2013 | Wurz | B05B 7/0012 |
| | | | 239/418 |
| 2014/0090394 A1 | 4/2014 | Low et al. | |
| 2016/0290649 A1* | 10/2016 | Prociw | F23R 3/286 |
| 2016/0362775 A1* | 12/2016 | Read | F01D 25/002 |

\* cited by examiner

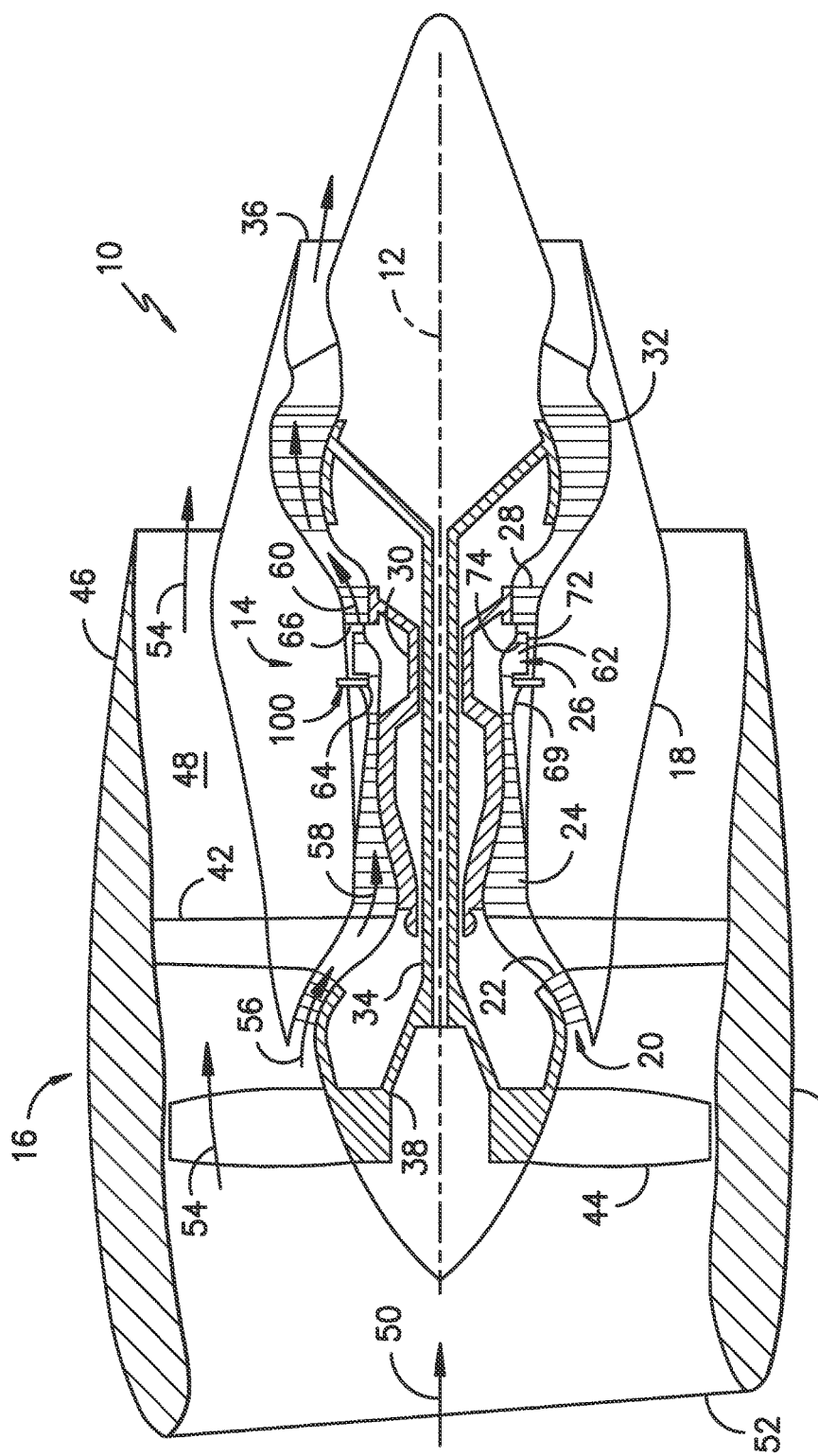
FIG. -1-

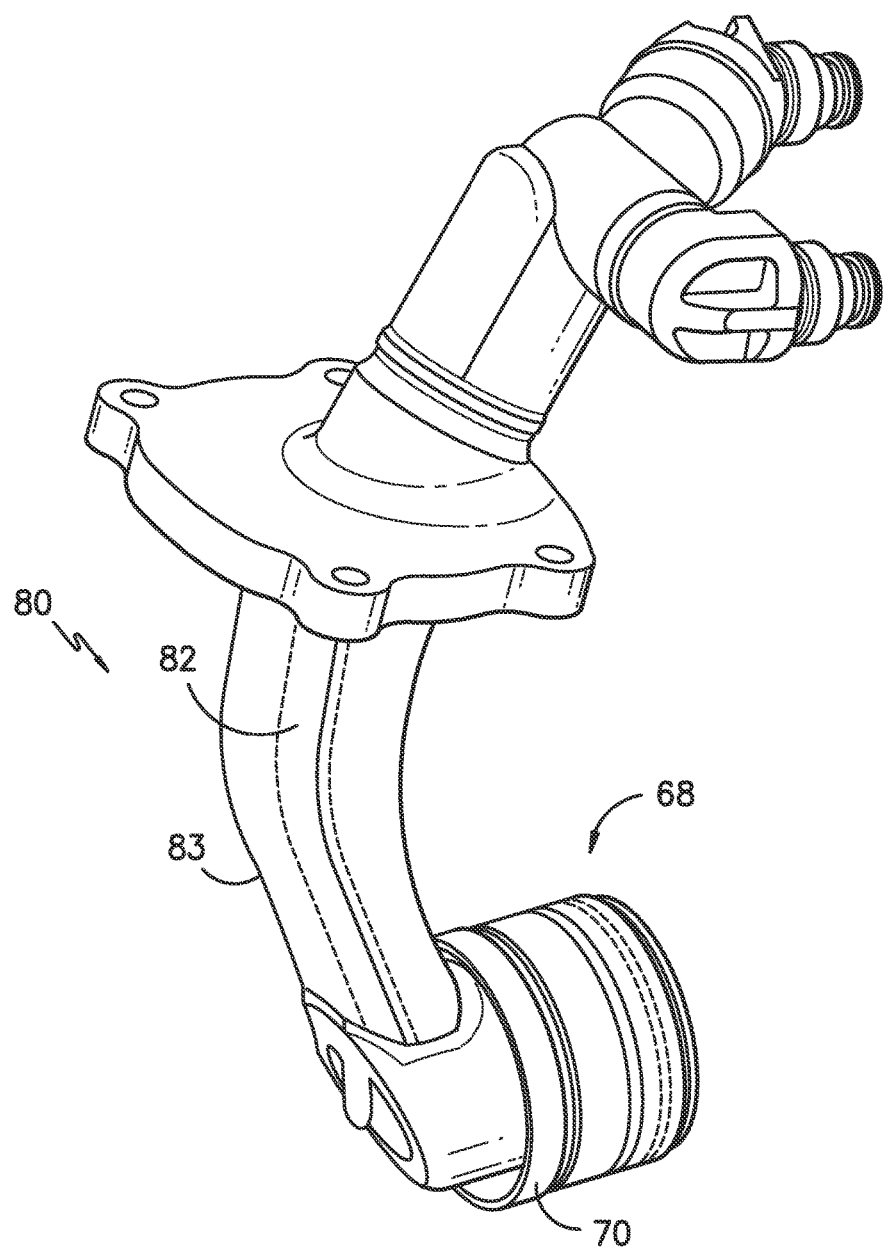
FIG. -2-
(PRIOR ART)

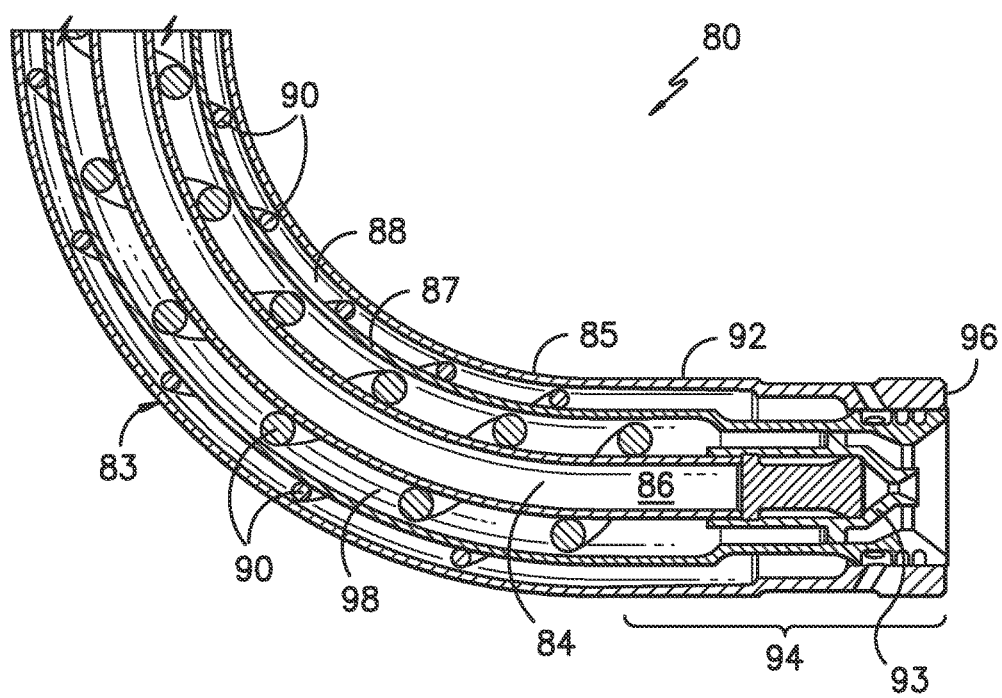
FIG. -3-
(PRIOR ART)

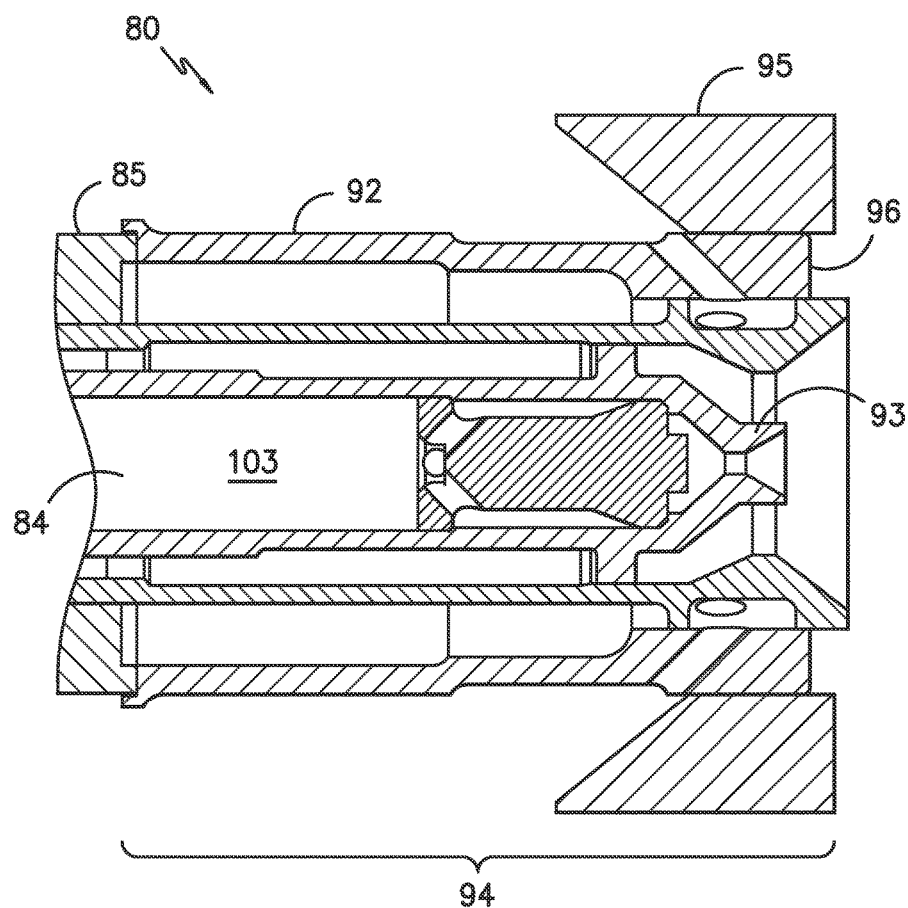
FIG. -4-
(PRIOR ART)

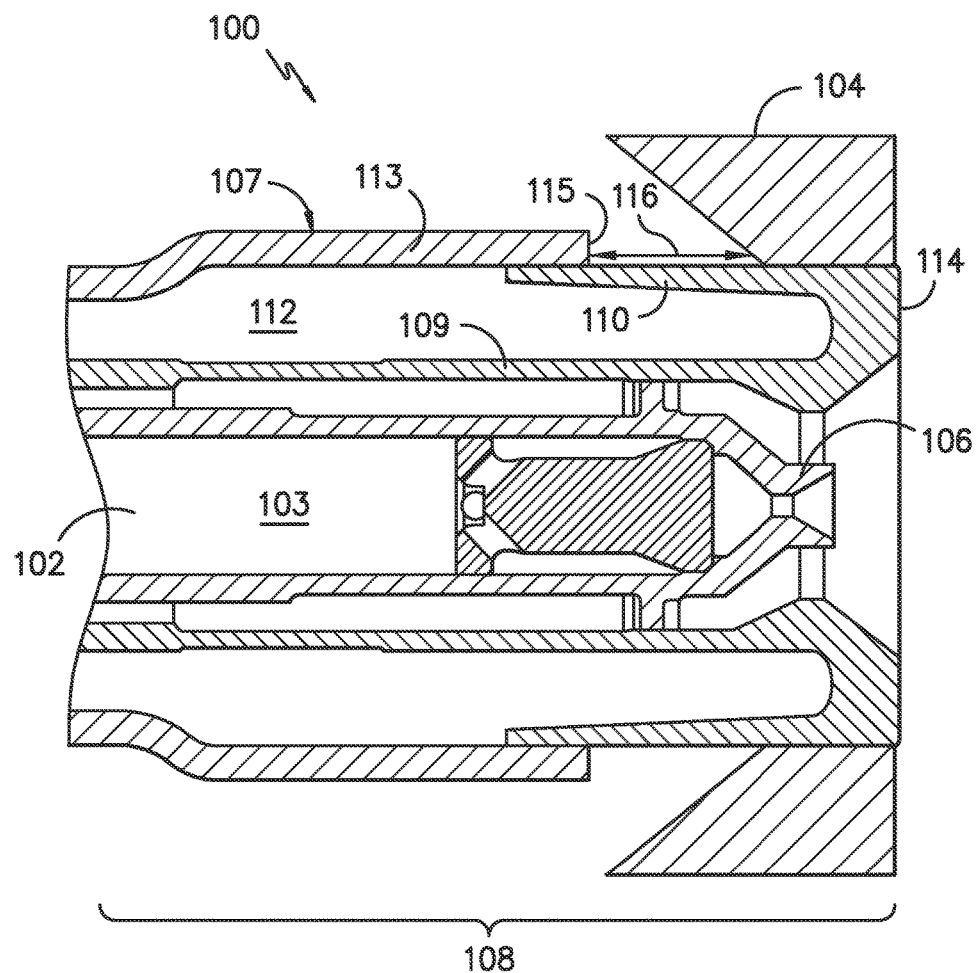
FIG. -5-

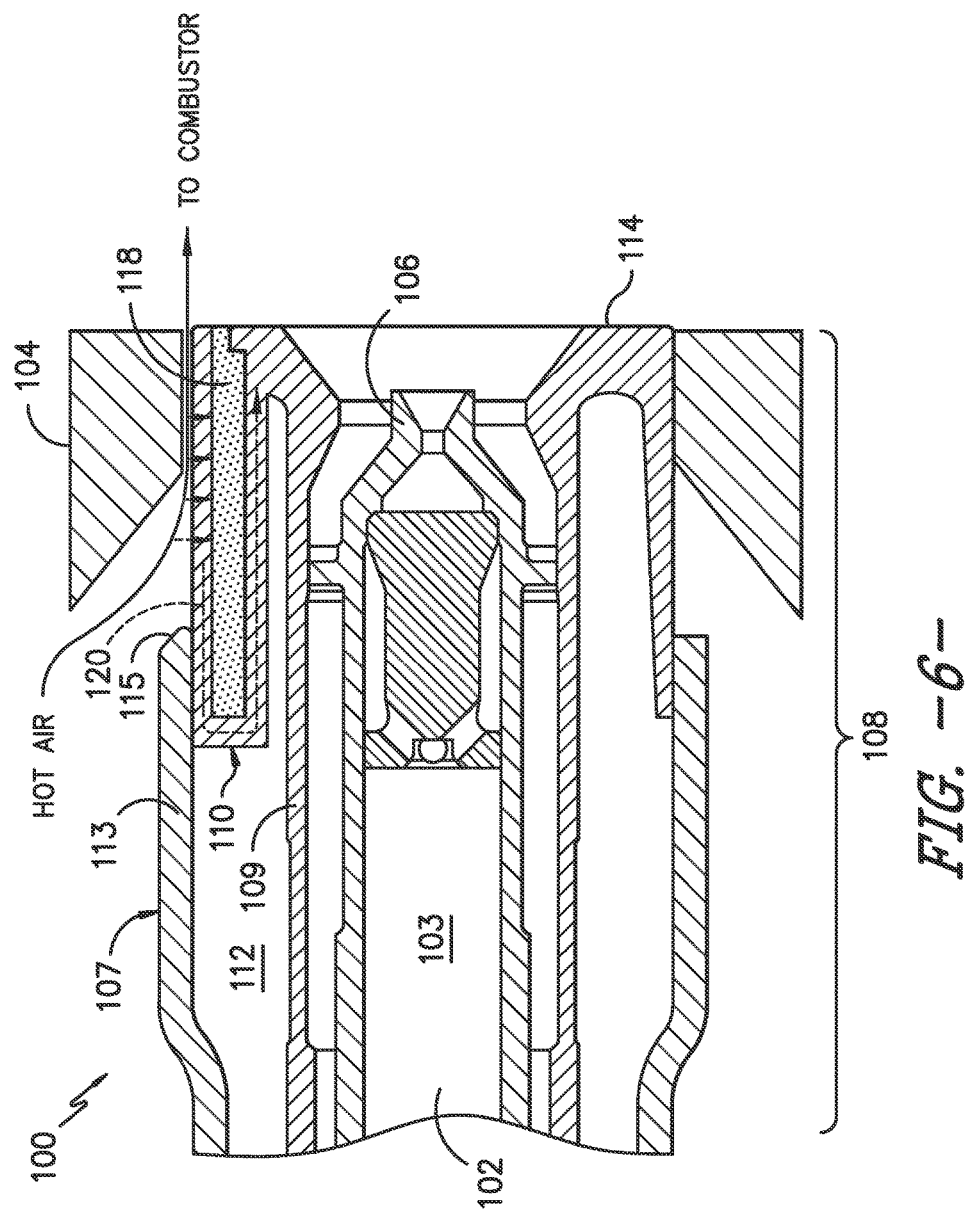
FIG. -6-

US 10,196,983 B2

1

FUEL NOZZLE FOR GAS TURBINE ENGINE

GOVERNMENT SUPPORT CLAUSE

This invention was made with government support under FA8650-09-D-2922 awarded by the United States Department of the Air Force. The government has certain rights in this invention.

FIELD OF THE INVENTION

The present subject matter relates generally to gas turbine engines. More particularly, the present disclosure relates to a fuel nozzle for a gas turbine engine.

BACKGROUND OF THE INVENTION

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor blades, rotor disks and retainers, and various stationary turbine components such as stator vanes or nozzles, turbine shrouds, and engine frames. The rotatable and stationary turbine components at least partially define the hot gas path through the turbine section. As the combustion gases flow through the hot gas path, thermal energy is transferred from the combustion gases to the rotatable and stationary turbine components.

Turbine engines also include one or more fuel nozzles for supplying fuel to the combustion section of the engine. Known fuel nozzles typically include one or more concentric tubes coaxially mounted so as to define one or more annular passages or conduits that allow for fluid to flow therethrough. More specifically, a typical fuel nozzle includes an external tube or heat shield having an inlet fitting at one end for receiving fuel and an atomizer nozzle at the other end for issuing atomized fuel into the combustor of a gas turbine engine. Thus, fuel can be introduced at the front end of a burner in a highly atomized spray from the fuel nozzle. Compressed air flows around the fuel nozzle and mixes with the fuel to form a fuel-air mixture, which is ignited by the burner. Thus, for typical fuel nozzles, the external heat shield is immersed in high temperature combustor gas while the inner fuel tube carries fuel at a much lower temperature than the compressed air. Elevated fuel temperatures can promote the formation of fuel-derived deposits that can unacceptably increase the total fuel nozzle flow restriction or change the flow velocity and/or jet shape. Further, due to the temperature differential, the external heat shield typically experiences thermal expansion differently than the inner fuel tube. More specifically, the external heat shield typically experiences thermal growth to a greater extent than the inner fuel tube.

In some fuel nozzles, the inner fuel tube(s) are rigidly connected to the external heat shield, e.g. using a welded or brazed joint. In such fuel nozzles, high stress concentrations can develop at the joint(s) due to thermal growth, thereby causing damage to the nozzle. Still further fuel nozzles may include detached inner fuel tube(s) and a detached external heat shield. In such embodiments, however, if the tube(s) and heat shield are completely decoupled and the external heat shield extends substantially the length of the nozzle and into the combustor, a variable size pocket can form at the combustor interface resulting in an auto-ignition risk.

Accordingly, the present disclosure is directed to a fuel nozzle that addresses the aforementioned issues associated with differing thermal expansion of nozzle components and the formation of fuel-derived deposits. More particularly, the present disclosure provides a fuel nozzle that compensates for thermal growth of the external heat shield relative to the inner fuel tube(s) during engine operation.

BRIEF DESCRIPTION OF THE INVENTION

Aspects and advantages of the invention will be set forth in part in the following description, or may be obvious from the description, or may be learned through practice of the invention.

In accordance with one aspect of the present disclosure, a fuel nozzle configured to channel fluid towards a combustion chamber defined within a gas turbine engine is provided. The fuel nozzle includes a stem having a central passageway and at least one fuel tube disposed within the central passageway. Further, the fuel tube includes an outlet end portion having an inner wall and an outer wall separated by a cavity defined by a fixed aft face. Further, the inner wall of the outlet end portion of the fuel tube defines a central bore for delivering fuel to the combustion chamber. In addition, the fuel nozzle includes an outer heat shield tube concentrically aligned with the outlet end portion of the fuel tube. Moreover, the heat shield tube includes a circumferential outer wall having an aft face that stops upstream of the fixed aft face of the fuel tube. Thus, during operation, the heat shield tube is configured to thermally expand by sliding against the outer wall of the fuel tube.

In another aspect, the present disclosure is directed to a fuel nozzle configured to channel fluid towards a combustion chamber defined within a gas turbine engine. The fuel nozzle includes a stem having a central passageway and at least one fuel tube disposed within the central passageway for delivering fuel to the combustion chamber. Further, the fuel tube includes an outlet end portion having an inner wall and an outer wall separated by a cavity defined by a fixed aft face. The fuel nozzle also includes an outer heat shield tube concentrically aligned with the outlet end portion of the fuel tube. Further, the fuel nozzle includes an insulator configured with the outer wall of the fuel tube and within the cavity so as to provide insulation between hot air outside of the fuel nozzle and fuel within the fuel tube. More specifically, the insulator is configured to fill at least a portion of the cavity and provide an extended path for thermal energy (e.g. heat) to flow while also preventing fuel ingestion within cavity.

In yet another aspect, the present disclosure is directed to a combustor assembly for use with a gas turbine engine. The combustor assembly includes a combustion chamber and a fuel nozzle configured to channel fluid towards the combustion chamber defined within the gas turbine engine. The fuel nozzle includes a stem having a central passageway and at least one fuel tube disposed within the central passageway. Further, the fuel tube includes an outlet end portion having an inner wall and an outer wall separated by a cavity defined by a fixed aft face. Further, the inner wall of the outlet end portion of the fuel tube defines a central bore for delivering fuel to the combustion chamber. In addition, the fuel nozzle includes an outer heat shield tube concentrically aligned with the outlet end portion of the fuel tube. Moreover, the heat shield tube includes a circumferential outer wall having an aft face that stops upstream of the fixed aft face of the fuel tube. Thus, during operation, the heat shield tube is configured to thermally expand by sliding against the outer wall of the fuel tube.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a schematic cross-sectional view of one embodiment of a gas turbine engine according to the present disclosure;

FIG. 2 illustrates a perspective view of one embodiment of a fuel nozzle for a gas turbine engine according to the present disclosure;

FIG. 3 illustrates a cross-sectional view of one embodiment of a fuel nozzle for a gas turbine engine according to conventional construction;

FIG. 4 illustrates a detailed, cross-sectional view of an outlet end portion of a fuel nozzle according to conventional construction;

FIG. 5 illustrates a detailed, cross-sectional view of one embodiment of a fuel nozzle according to the present disclosure, particularly illustrating an outlet end portion of a fuel tube of the fuel nozzle; and FIG. 6 illustrates a detailed, cross-sectional view of another embodiment of a fuel nozzle according to the present disclosure, particularly illustrating an outlet end portion of a fuel tube of the fuel nozzle having an insulator configured therein.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference.

Generally, the present disclosure is directed to a fuel nozzle configured to channel fluid towards a combustion chamber defined within a gas turbine engine is provided. More specifically, the fuel nozzle includes a stem having a central passageway and at least one fuel tube disposed within the central passageway. Further, the fuel tube includes an outlet end portion having an inner wall and an outer wall separated by a cavity defined by a fixed aft face. Further, the inner wall of the outlet end portion of the fuel tube defines a central bore for delivering fuel to the combustion chamber. In addition, the fuel nozzle includes an outer heat shield tube concentrically aligned with the outlet end portion of the fuel tube. Moreover, the heat shield tube includes a circumferential outer wall having an aft face that stops upstream of the fixed aft face of the fuel tube. Further, the fuel nozzle includes a fitting configured against the outer wall of the outlet end portion of the fuel tube between the aft face of the heat shield tube and the combustion chamber. Thus, during operation of the gas turbine engine, the circumferential outer wall of the heat shield tube is configured to thermally expand by sliding against the outer wall of the fuel tube forward of the fitting and the combustion chamber such that the heat shield tube does not expand past the fixed aft face of the fuel tube and into the combustor.

The present disclosure provides various advantages not present in the prior art. For example, the fuel nozzle of the present disclosure generates fuel-derived deposits at a lower rate than known nozzles. Further, the fuel nozzle of the present disclosure reduces auto-ignition risk by preventing the heat shield tube from expanding into the combustor. Further, the fuel nozzle of the present disclosure reduces fuel ingestion into air cavities and reduces thermal stress of the nozzle.

Referring now to the drawings, FIG. 1 illustrates a schematic cross-sectional view of one embodiment of a gas turbine engine 10 (high-bypass type) incorporating an exemplary fuel nozzle 100 according to the present disclosure. As shown, the gas turbine engine 10 has an axial longitudinal centerline axis 12 therethrough for reference purposes. Further, as shown, the gas turbine engine 10 preferably includes a core gas turbine engine generally identified by numeral 14 and a fan section 16 positioned upstream thereof. The core engine 14 typically includes a generally tubular outer casing 18 that defines an annular inlet 20. The outer casing 18 further encloses and supports a booster 22 for raising the pressure of the air that enters core engine 14 to a first pressure level. A high pressure, multi-stage, axial-flow compressor 24 receives pressurized air from the booster 22 and further increases the pressure of the air. The pressurized air flows to a combustor 26, where fuel is injected into the pressurized air stream and ignited to raise the temperature and energy level of the pressurized air. The high energy combustion products flow from the combustor 26 to a first (high pressure) turbine 28 for driving the high pressure compressor 24 through a first (high pressure) drive shaft 30, and then to a second (low pressure) turbine 32 for driving the booster 22 and the fan section 16 through a second (low pressure) drive shaft 34 that is coaxial with the first drive shaft 30. After driving each of the turbines 28 and 32, the combustion products leave the core engine 14 through an exhaust nozzle 36 to provide at least a portion of the jet propulsive thrust of the engine 10.

The fan section 16 includes a rotatable, axial-flow fan rotor 38 that is surrounded by an annular fan casing 40. It will be appreciated that fan casing 40 is supported from the core engine 14 by a plurality of substantially radially-extending, circumferentially-spaced outlet guide vanes 42. In this way, the fan casing 40 encloses the fan rotor 38 and the fan rotor blades 44. The downstream section 46 of the fan casing 40 extends over an outer portion of the core engine 14 to define a secondary, or bypass, airflow conduit 48 that provides additional jet propulsive thrust.

From a flow standpoint, it will be appreciated that an initial airflow, represented by arrow 50, enters the gas turbine engine 10 through an inlet 52 to the fan casing 40. The airflow passes through the fan blades 44 and splits into a first air flow (represented by arrow 54) that moves through the conduit 48 and a second air flow (represented by arrow 56) which enters the booster 22.

The pressure of the second compressed airflow 56 is increased and enters the high pressure compressor 24, as represented by arrow 58. After mixing with fuel and being combusted in the combustor 26, the combustion products 60 exit the combustor 26 and flow through the first turbine 28. The combustion products 60 then flow through the second turbine 32 and exit the exhaust nozzle 36 to provide at least a portion of the thrust for the gas turbine engine 10.

Still referring to FIG. 1, the combustor 26 includes an annular combustion chamber 62 that is coaxial with the longitudinal centerline axis 12, as well as an inlet 64 and an outlet 66. As noted above, the combustor 26 receives an annular stream of pressurized air from a high pressure compressor discharge outlet 69. A portion of this compressor discharge air flows into a mixer (not shown). Fuel is injected from a fuel nozzle 100 to mix with the air and form a fuel-air mixture that is provided to the combustion chamber 62 for combustion. Ignition of the fuel-air mixture is accomplished by a suitable igniter, and the resulting combustion gases 60 flow in an axial direction toward and into an annular, first stage turbine nozzle 72. The nozzle 72 is defined by an annular flow channel that includes a plurality of radially-extending, circumferentially-spaced nozzle vanes 74 that turn the gases so that they flow angularly and impinge upon the first stage turbine blades of the first turbine 28. As shown in FIG. 1, the first turbine 28 preferably rotates the high-pressure compressor 24 via the first drive shaft 30, whereas the low-pressure turbine 32 preferably drives the booster 22 and the fan rotor 38 via the second drive shaft 34.

The combustion chamber 62 is housed within the engine outer casing 18. Fuel is supplied into the combustion chamber 62 by one or more fuel nozzles 80, such as for example shown in FIGS. 2-4. Liquid fuel is transported through one or more passageways 82 or conduits within a stem 83 of the fuel nozzle 80, such as, for example, shown in FIG. 2, to the fuel nozzle tip assembly 68. Further, the fuel supply conduits 82 may be located within the stem 83 and coupled to a fuel distributor tip 70.

More specifically, as shown in FIGS. 3-4, a typical fuel nozzle 80 includes a central fuel tube 84 disposed within the stem 83. Further, the fuel nozzle 80 may include one or more outer hollow tubes 85, 87 concentrically aligned with the inner fuel tube 84. The fuel tube 84 defines a central bore 86 configured to channel fuel therethrough to the combustion chamber 62. In certain embodiments, the fuel tube 84 may also include an atomizer nozzle 93 for issuing atomized fuel into the combustion chamber 62 of the gas turbine engine 10. Thus, fuel can be introduced at the front end of the combustion chamber 62 in a highly atomized spray from the fuel nozzle 80. Although the figures illustrate fuel nozzles having three concentric tubes, it should also be understood that fuel nozzles 100 according to the present disclosure may also include more than three or less than three concentric tubes.

In addition, as shown in FIG. 3, the hollow tubes 84, 85, 87 may be separated by one or more annular gaps 88, 98. For example, as shown, the outer tube 85 may define a first annular gap 88 with the middle hollow tube 87. Further, the middle hollow tube 87 may define a second annular gap 98 with the central hollow tube 84. Thus, as shown, the fuel nozzle 80 may include one or more spacer wires 90 retained within either or both of the annular gaps 88, 98. In addition, the fuel nozzle 80 may include an outer heat shield tube 92 concentrically aligned with at least a portion of the fuel tube 84. More specifically, as generally shown in FIGS. 3-4, the outer heat shield tube 92 is located at an outlet end portion 94 of the fuel tube 84. Further, as shown in FIG. 4, the outlet end portion 94 of conventional fuel nozzles 80 may also include a fitting 95 (e.g. a ferrule) configured circumferentially around one end of the heat shield tube 92.

During operation of the conventional fuel nozzles 80, such as those illustrated in FIGS. 2-4, the outer heat shield 92 thermally expands towards the combustion chamber 62, e.g. due to the temperature differential between fuel flowing through the fuel tube 84 and air outside of the nozzle 80. As such, for the conventional fuel nozzles as shown in FIGS. 3 and 4, an aft face 96 of the outer heat shield 92 expands substantially the length of the nozzle 80 and into the combustion chamber 62. Thus, a variable size pocket can form at the combustor interface resulting in an auto-ignition risk for the gas turbine engine 10.

As such, FIGS. 1, 5 and 6 illustrate various embodiments of a fuel nozzle 100 according to the present disclosure that addresses the aforementioned issues as described herein. It should be understood that the fuel nozzle 100 of the present disclosure may include any of the features as described herein within respect to the fuel nozzle 80 of FIGS. 2-4. More specifically, as shown in FIGS. 5 and 6, the fuel nozzle 100 of the present disclosure may include a central fuel tube 102 and at least one outer hollow tube (e.g. such as the outer tubes 85, 87 as discussed herein) concentrically aligned with the inner fuel tube 102. In certain embodiments, the fuel tube 102 may also include an atomizer nozzle 106 for issuing atomized fuel into the combustion chamber 62 of the gas turbine engine 10. Thus, fuel can be introduced at the front end of the combustion chamber 62 in a highly atomized spray from the fuel nozzle 100.

More specifically, as shown in FIGS. 5-6, the fuel tube 102 may include an outlet end portion 108 having an inner wall 109 and an outer wall 110 separated by a cavity 112 defined by a fixed aft face 114. For example, as shown, the inner wall 109 of the outlet end portion 108 of the fuel tube 102 defines a central passageway 103 for delivering fuel to the combustion chamber 62 and curves up at the nozzle outlet to form the fixed aft face 114 and the outer wall 110. Thus, as shown, the fixed aft face 114 of the fuel tube 102 may be substantially perpendicular to the inner and outer walls 109, 110 of the fuel tube 102. More specifically, in such embodiments, the inner and outer walls 109, 110 and the fixed aft face 114 of the fuel tube 102 may define a substantially U-shaped cross-section. Alternatively, the inner and outer walls 109, 110 and the fixed aft face 114 of the fuel tube 102 may define any suitable cross-section, such as for example, a C-shaped cross-section. Accordingly, as shown in FIGS. 5 and 6, the cavity 112 may include a vented air cavity formed by the inner and outer walls 109, 110 of the fuel tube 102, the fixed aft face 114 of the fuel tube 102, and a circumferential outer wall 113 of the heat shield tube 107.

In addition, as shown, the fuel nozzle 100 may include an outer heat shield tube 107 concentrically aligned with at least a portion of the fuel tube 102. More specifically, as shown, the circumferential outer wall 113 of the heat shield tube 107 may be engaged with the outer wall 110 of the fuel tube 102. In addition, the circumferential outer wall 113 of the heat shield tube 107 may have an aft face 115 that stops upstream of the fixed aft face 114 of the fuel tube 102.

Still referring to FIGS. 5 and 6, the outlet end portion 108 of the fuel nozzle 100 may also include a fitting 104 configured against the outer wall 110 of the outlet end portion 108 of the fuel tube 102. More specifically, as shown, the fitting 104 is configured between the aft face 115 of the heat shield tube 107 and the combustion chamber 62. Thus, during operation, the circumferential outer wall 113 of the heat shield tube 107 is configured to thermally expand by sliding against the outer wall 110 of the fuel tube 102 but is separated from the combustion chamber 62 by the fitting 104. For example, as shown in FIG. 5, the fuel nozzle 100 may include a gap 116 between the aft face 115 of the heat shield tube 107 and the fitting 104. In such an embodiment, the heat shield tube 107 is configured to expand toward the fitting 104 within the gap 116 upstream of the fitting 104.

It should be understood that the fitting 104 as described herein may include any suitable fitting. For example, in certain embodiments, the fitting 104 may include a ferrule. As used herein, a ferrule generally encompasses any bracket, often ring-shaped, that is used for fastening, joining, sealing, or reinforcement. Thus, example ferrules may include eyelets, grommets, or similar.

Referring particularly to FIG. 6, the fuel nozzle 100 may also include an insulator 118 configured with the outer wall 110 of the fuel tube 102 and/or within the cavity 112 so as to provide insulation between hot air outside of the fuel nozzle 100 and fuel within the fuel tube 102. Thus, as shown, the insulator 118 is configured to provide an extended path for thermal energy (e.g. heat) to flow, as indicated by dotted lines 120, for the heat exposed to the outside of the nozzle 100 to travel to the fuel tube 102. In addition, the insulator 118 is configured to prevent fuel ingestion within the cavity 112. Further, it should be understood that the insulator 118 may be constructed of any suitable insulating material. For example, in certain embodiments, the insulator 118 may be constructed, at least in part, of yttria-stabilized zirconia.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel nozzle for channeling fluid towards a combustion chamber defined within a gas turbine engine, the fuel nozzle comprising:
   a stem comprising a central passageway;
   at least one fuel tube disposed within the central passageway, the fuel tube comprising an outlet end portion having an inner wall that extends to an outlet of the fuel tube and curves up to form an aft face at the outlet that extends substantially perpendicular to the inner wall and back to form an outer wall generally parallel to the inner wall, the outer wall separated from the inner wall by an open cavity defined by the aft face, the inner wall defining a central bore for delivering fuel to the combustion chamber;
   an outer heat shield tube concentrically aligned with the outlet end portion of the fuel tube and external to the inner and outer walls and the open cavity of the fuel tube, the heat shield tube comprising a circumferential outer wall having an aft edge that stops upstream of the aft face of the fuel tube; and
   a fitting arranged between the aft edge of the heat shield tube and the combustion chamber and spaced apart from the aft edge of the heat shield by a gap;
   wherein, during operation, the circumferential outer wall of the heat shield tube is configured to thermally expand by sliding against an outer surface of the outer wall of the fuel tube forward of the fitting and the combustion chamber and within the gap.

2. The fuel nozzle of claim 1, wherein the fitting comprises a ferrule.

3. The fuel nozzle of claim 1, wherein the cavity comprises a vented air cavity defined by the inner and outer walls of the fuel tube, the aft face of the fuel tube, and the circumferential outer wall of the heat shield tube.

4. The fuel nozzle of claim 1, wherein the aft face of the fuel tube is substantially perpendicular to the inner and outer walls of the fuel tube.

5. The fuel nozzle of claim 4, wherein the inner and outer walls and the aft face of the fuel tube define a substantially U-shaped cross-section.

6. The fuel nozzle of claim 1, further comprising an insulator configured with the outer wall of the fuel tube within the cavity so as to provide insulation between hot air outside of the fuel nozzle and fuel within the fuel tube, wherein the insulator provides an extended thermal conduction path for the hot air.

7. The fuel nozzle of claim 6, wherein the insulator is constructed, at least in part, of yttria-stabilized zirconia.

8. A combustor assembly for use with a gas turbine engine, the combustor assembly comprising:
   a combustion chamber;
   a fuel nozzle configured to channel fluid towards the combustion chamber defined within the gas turbine engine, the fuel nozzle comprising:
   a stem comprising a central passageway;
   at least one fuel tube disposed within the central passageway, the fuel tube comprising an outlet end portion having an inner wall that extends to an outlet of the fuel tube and curves up to form an aft face at the outlet that extends substantially perpendicular to the inner wall and back to form an outer wall separated by an open cavity defined by the aft face, the inner wall defining a central bore for delivering fuel to the combustion chamber;
   an outer heat shield tube concentrically aligned with the outlet end portion of the fuel tube and external to the inner and outer walls and the open cavity of the at least one fuel tube, the heat shield tube comprising a circumferential outer wall having an aft edge that stops upstream of the aft face of the fuel tube and a fitting arranged between the aft edge of the heat shield tube and the combustion chamber and spaced apart from the aft edge of the heat shield by a gap;

wherein, during operation, the circumferential outer wall of the heat shield tube is configured to thermally expand by sliding against an outer surface of the outer wall of the fuel tube forward of the fitting and the combustion chamber and within the gap.

9. The combustor assembly of claim 8, wherein the fitting comprises a ferrule.

10. The combustor assembly of claim 8, wherein the cavity comprises a vented air cavity defined by the inner and outer walls of the fuel tube, the aft face of the fuel tube, and the circumferential outer wall of the heat shield tube.

11. The combustor assembly of claim 8, wherein the inner and outer walls and the aft face of the fuel tube define a substantially U-shaped cross-section.

12. The combustor assembly of claim 8, further comprising an insulator configured with the outer wall of the fuel tube within the cavity so as to provide insulation between hot air outside of the fuel nozzle and fuel within the fuel tube, wherein the insulator fills at least a portion of the cavity and provides an extended thermal conduction path for the hot air.

13. The combustor assembly of claim 12, wherein the insulator is constructed, at least in part, of yttria-stabilized zirconia.

* * * * *